(12) United States Patent
McBrearty

(10) Patent No.: US 12,530,484 B2
(45) Date of Patent: Jan. 20, 2026

(54) SEARCHABLE SYMMETRIC ENCRYPTION

(71) Applicant: VAULTREE LTD., Cork (IE)

(72) Inventor: Shaun McBrearty, Cork (IE)

(73) Assignee: VAULTREE LIMITED (IE)

( * ) Notice: Subject to any disclaimer, the term of this patent is extended or adjusted under 35 U.S.C. 154(b) by 0 days.

(21) Appl. No.: 18/830,359

(22) Filed: Sep. 10, 2024

(65) Prior Publication Data
US 2025/0086306 A1 Mar. 13, 2025

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
CPC ... G06F 21/6227; G06F 21/602; H04L 9/0894
See application file for complete search history.

(56) References Cited

U.S. PATENT DOCUMENTS

| | | | |
|---|---|---|---|
| 10,614,135 B2 | 4/2020 | Grubbs | |
| 11,669,506 B2 | 6/2023 | McBrearty | |
| 2012/0159180 A1* | 6/2012 | Chase | H04L 9/0869 713/184 |
| 2018/0060435 A1* | 3/2018 | Grubbs | G06F 16/951 |

OTHER PUBLICATIONS

Huaze, Ling, et al. "An efficient multi-user multi-keyword fuzzy search scheme over encrypted cloud storage." JUSTC 51.7 (2021): 562-576. (Year: 2021).*
EP Search Report issued in 23196506.2, Feb. 6, 2024, 9 pgs.
Huaze, et al., "An efficient multi-user multi-keyword fuzzy search scheme over encrypted cloud storage", Journal of University of Science and Technology of China, vol. 51, No. 7, Jul. 2021, 562-576.

* cited by examiner

*Primary Examiner* — Sangseok Park
(74) *Attorney, Agent, or Firm* — Bochner PLLC; Andrew D. Bochner

(57) ABSTRACT

The present disclosure is directed towards a method of generating a modified permuterm index entry for use in a search for a keyword in a portion of an encrypted data collection, including identifying a keyword in one or more portions of an encrypted data collection; generating a permuterm index entry for the keyword, wherein the permuterm index entry comprises X values including a delimiting value inserted after the last value of the keyword, wherein the delimiting value marks the end of the keyword; generating a modified permuterm index entry for the keyword from the permuterm index entry, wherein the modified permuterm index entry comprises the first Y values of the permuterm index entry appended with a zero-or-more wildcard value, wherein Y is greater than zero and Y is less than or equal to X; and storing the modified permuterm index entry in a modified permuterm index. A data structure for use in a search for a keyword in a portion of an encrypted data collection, wherein the data structure is a modified permuterm index entry, is also provided.

14 Claims, 4 Drawing Sheets

Table 1

| Entry | Values stored in the entry |
|---|---|
| 1 | hello$ |
| 2 | ello$h |
| 3 | llo$he |
| 4 | lo$hel |
| 5 | o$hell |
| 6 | $hello |

Figure 1

| Table 1 | |
|---|---|
| Entry | Values stored in the entry |
| 1 | hello$ |
| 2 | ello$h |
| 3 | llo$he |
| 4 | lo$hel |
| 5 | o$hell |
| 6 | $hello |

Figure 2

| Description | Wildcard Search Query | Modified Wildcard Search Query |
|---|---|---|
| No 'Zero-or-More' Wildcard Character | hel_o$ | hel_o$ |
| Leading 'Zero-or-More' Wildcard Character | %o$ | o$% |
| Trailing 'Zero-or-More' Wildcard Character | h%$ | $h% |
| Middle 'Zero-or-More' Wildcard Character | h%o$ | o$h% |
| Bracketing 'Zero-or-More' Wildcard Characters | %l% | l% |
| Multiple Middle 'Zero-or-More' Wildcard Characters | h%l%o$ | o$h%l% |

Table 2

Figure 3

| | Modified Permuterm Entry values | | | | | |
|---|---|---|---|---|---|---|
| Normal Permuterm Entry values | 1 Char | 1-2 Char | 1-3 Char | 1-4 Char | 1-5 Char | 1-6 Char |
| hello$ | h% | he% | hel% | hell% | hello%``` | hello$% |
| ello$h```` | e% | el% | ell% | ello%``` | ello$% | ello$h% |
| llo$he```` | l% | ll% | llo%``` | llo$% | llo$h% | llo$he% |
| lo$hel```` | l%` | lo%``` | lo$% | lo$h% | lo$he% | lo$hel% |
| o$hell```` | o%``` | o$% | o$h% | o$he% | o$hel% | o$hell% |
| $hello```` | $%`` | $h% | $he% | $hel% | $hell% | $hello% |

Table 3

Figure 4

| Table 4 |||||
| Keyword = FK(hello) |||||
| # | Value | | # | Value |
|---|---|---|---|---|
| 1 | FK($h%) | | 16 | FK(l%) |
| 2 | FK($he%) | | 17 | FK(ll%) |
| 3 | FK($hel%) | | 18 | FK(llo$%) |
| 4 | FK($hell%) | | 19 | FK(llo$h%) |
| 5 | FK($hello%) | | 20 | FK(llo$he%) |
| 6 | FK(e%) | | 21 | FK(lo$%) |
| 7 | FK(el%) | | 22 | FK(lo$h%) |
| 8 | FK(ell%) | | 23 | FK(lo$he%) |
| 9 | FK(ello$%) | | 24 | FK(lo$hel%) |
| 10 | FK(ello$h%) | | 25 | FK(o$%) |
| 11 | FK(h%) | | 26 | FK(o$h%) |
| 12 | FK(he%) | | 27 | FK(o$he%) |
| 13 | FK(hel%) | | 28 | FK(o$hel%) |
| 14 | FK(hell%) | | 29 | FK(o$hell%) |
| 15 | FK(hello$) | | | |

SEARCHABLE SYMMETRIC ENCRYPTION

PRIORITY CLAIM

The present application claims the benefit of European Application No. 23196506.2, filed on Sep. 11, 2023, the entirety of which is incorporated herein by reference.

TECHNICAL FIELD

The present disclosure is directed towards systems and methods for performing a wildcard search which is suitable for use with searchable symmetric encryption. In particular, the present disclosure is directed towards generating indexes capable of supporting wildcard searching that can be used with a Searchable Symmetric Encryption (SSE) System.

BACKGROUND

Data can be encrypted using Searchable Symmetric Encryption (SSE). As described in the applicant's co-pending U.S. application Ser. No. 17/656,164 (which is incorporated herein by reference) SEE allows a data collection to be encrypted using traditional symmetric encryption algorithms in such a way that they can still be searched. In particular, searching is performed using a special-purpose index data structure (referred to herein as an index for brevity). The index is created from the data collection prior to the data collection being encrypted. The index contains terms (which are also referred to as keywords) which occur in the data collection—i.e. a keyword can be used to perform a search and the resultant search will return a list of portions of the data collection, such as e.g. documents, containing the keyword. Typically, this comprises generating and storing a posting list. The posting list is a data structure where an entry in the posting list comprises a keyword and an identification of each portion of the data collection containing the keyword.

Once the index has been created, using any suitable searchable symmetric encryption scheme, the data collection can be encrypted. The contents of the index, and in some embodiments the posting list, are also encrypted. As a result, when a search is performed, the keyword can be sent to a search engine in an encrypted form.

In this disclosure, a portion of the data collection is taken to mean any form of structured or unstructured data. For example, a portion of the data collection could be a file, such as a document (e.g. a document containing text—such as, but not limited to a CSV File, a Database Table, a pdf or word file, etc.), an image file, an audio file, a log file, data receive from, or sent to, APIs, a video file, an object-oriented class (e.g. an AI frame), etc. In addition, a portion of the data collection could also be a sub-component of a file—in this case the file itself is the collection. For example, a portion of the data collection could be: a video frame or an image (e.g. a face) in a video; an entry in a database; a communication frame in a data transmission; meta data; etc.

SSE is typically used in a client-server setting. In particular, an encrypted data structure collection and an associated index are stored separately or together on one or more servers. One or more clients can then issue search queries to the server(s). The search queries function to request a set of all data structures that contain a set of specified search terms. To perform search operation in SSE, clients must provide servers with a search token. The search token is an encrypted sequence of one or more data values based on the plaintext term(s) being searched for. The server responds to the search token by providing a response that comprises a set of encrypted data structures that contain the received search token. These data structures can then be decrypted locally by the client for use at the client.

While there are a number of existing solutions to performing an index-based wildcard search on encrypted data, all existing solutions are flawed. For example, known solutions generate false positives. To put it differently, a problem with known solutions is that they incorrectly identify zero or more keywords as matching a wildcard query. For example, given the wildcard query 'Q %'. A match should not occur against the keyword 'King'; however, some systems may incorrectly match this wildcard query to this keyword—and by extension—the set of records associated with that keyword. Zero false positives implies that no keywords were incorrectly matched to a wildcard query. However there is no way of knowing this without performing the post processing after this initial match has occurred. In order to remove false positives from a result set, an additional post-processing must be performed. Although the post-processing is trivial to perform on plaintext data, there is no known way of performing the post-processing on encrypted data. I.e. at present, there is no known way of performing the required post-processing associated with an index-based wildcard search on encrypted data that avoids the need to decrypt the data before post-processing.

SUMMARY

The present disclosure is directed towards improvements in performing a wildcard search on encrypted data. In particular, the present disclosure is directed towards a method and system for a wildcard search on encrypted data that produces a more accurate result set. The method and system can remove all false positives without the need decrypt data or perform a post-processing operation to remove false positives.

The present disclosure is directed towards a method of generating a modified permuterm index entry for use in a search for a keyword in a portion of an encrypted data collection. The method comprises, at a client: identifying a keyword in one or more portions of an encrypted data collection; generating a permuterm index entry for the keyword, wherein the permuterm index entry comprises X values including a delimiting value inserted after the last value of the keyword, wherein the delimiting value marks the end of the keyword; generating a modified permuterm index entry for the keyword from the permuterm index entry, wherein the modified permuterm index entry comprises the first Y values of the permuterm index entry appended with a zero-or-more wildcard value, wherein Y is greater than zero and Y is less than or equal to X; and storing the modified permuterm index entry in a modified permuterm index.

In some embodiments, storing comprises: determining if the modified permuterm index entry is a duplicate of another modified permuterm index entry already stored in the modified permuterm index; and storing the modified permuterm index entry in the modified permuterm index if the modified permuterm index entry is not a duplicate of another modified permuterm index entry already stored in the modified permuterm index.

In some embodiments, storing comprises: determining if the permuterm index entry consists of a delimiting value and a wildcard value; and storing the modified permuterm index entry in the modified permuterm index if the modified permuterm index entry does not consist of a delimiting value and a wildcard value.

In some embodiments, storing comprises: determining if the last value of the keyword is present in the modified permuterm index and storing the modified permuterm index if it does not comprise the last value of the keyword; determining if the last value of the keyword is followed by the delimiting value in the modified permuterm index; and storing the modified permuterm index entry in the modified permuterm index if the last value of the keyword in the modified permuterm index entry is followed by the delimiting value.

In some embodiments, storing comprises: determining if the last value of permuterm index entry is the delimiting value; and storing the permuterm index entry in the modified permuterm index if the last value of permuterm index entry is the delimiting value.

In some embodiments, the method comprises: encrypting the modified permuterm index; encrypting the data collection; and sending the encrypted modified permuterm index and the encrypted data collection to a server.

In some embodiments, a Hash-based Message Authentication Code, HMAC, is used to encrypt the modified permuterm index. In some embodiments, a value is a binary value representing an alphanumeric character.

In some embodiments, the method further comprises storing an additional entry in the modified permuterm index, wherein the additional entry is configured in use to generate a false positive.

In some embodiments, the zero-or-more wildcard value indicates an unknown number of unknown values.

The present disclosure is also directed towards a method for retrieving one or more portions of an encrypted data collection. This method comprises, at a server: receiving a search token, wherein the search token is an encrypted search query; comparing the values of the search token to the values of an entry in a modified permuterm index, wherein the modified permuterm index comprises a plurality of encrypted entries for a keyword wherein at least one entry has less values than another entry; and if the values of the search token match the values of the entry of the modified permuterm index, identifying one or more portions of an encrypted data collection associated with the keyword.

The present disclosure is also directed towards a data processing device comprising means for carrying out a method as described above.

The present disclosure is further directed towards a computer program comprising instructions which, when executed by a computing device, cause the computing device to perform a method as described above. A computer readable storage medium comprising such a computer program is also disclosed.

The present disclosure is also directed towards a data structure for use in a search for a keyword in a portion of an encrypted data collection, wherein the data structure is a modified permuterm index entry which comprises: the first Y values of the permuterm index entry for the keyword, wherein the permuterm index entry comprises X values including a delimiting value inserted after the last value of the keyword, and the delimiting value marks the end of the keyword; and a zero-or-more wildcard value appended to the first Y values of the permuterm index entry for the keyword, wherein: Y is greater than zero and Y is less than or equal to X.

BRIEF DESCRIPTION OF THE DRAWINGS

The disclosure will be more clearly understood from the following description of an embodiment thereof, given by way of example only, with reference to the accompanying drawings, in which:

FIG. 1 shows the entries for the permuterm index for the keyword 'hello.'

FIG. 2 sets out a number of examples of modified wildcard search queries.

FIG. 3 illustrates the generation of modified permuterm Index entries from the set of normal permuterm index.

FIG. 4 shows an example of a modified permuterm index for the keyword 'hello.'

DETAILED DESCRIPTION

The present disclosure is directed towards a system and method which implement an index that can support a wildcard search in an encrypted system. The encrypted system can be an SSE system. Further, the present disclosure describes how the one or more index entries associated with a permuterm index are generated. Further still, the present disclosure describes how a search token is used with the one or more index entries associated with the permuterm index to search the index. A permuterm index is a type of index which is particularly suitable for wildcard searching.

In accordance with the present disclosure, a wildcard search is performed using an index. As known in the art, it is possible to perform a wildcard search over plaintext data without using an index. However, without the use of an index, a wildcard search is a linear operation and, as such, does not scale well for large data sets. In relational database systems utilizing SQL, significant existing relational database providers do not require an index to be explicitly created in order to support—or expedite—a wildcard search. However, it is known create an index to support a wildcard searching for document search engines (such as ELASTICSEARCH™).

However there has been a prejudice in the art that data security and data usability, while both desirable, are fundamentally incompatible. There is therefore a need for privacy-enhancing encryption that will strengthen the protection of data while still enabling ease of use for data owners. As such, there is a continuing and long standing need to make encrypted data easy to process in its encrypted form so that it is both secure and usable.

There are a number of potential different approaches to performing a wildcard search. Some wildcard search techniques have been designed specifically to operate on encrypted data, whilst other techniques have focused on adapting mechanisms used in plaintext searches to operate on encrypted data. However, all known wildcard search techniques generate false positives. I.e., wildcard search results include false positives which have been incorrectly identified as matching a given wildcard query.

An index that produces such false positives requires significantly less storage space in comparison to an index that produce perfectly accurate result sets. When used to search plaintext data, identifying and removing false positives from a result set is not a computationally expensive operation. As such, there has been a prejudice in the art towards lightweight indexes with low memory requirements because the low computational cost is seen as representing an acceptable trade-off between storage and performance.

However, there is no satisfactory way of identifying and removing false positives search results from a wildcard search of encrypted data. In addition, the searching of encrypted data is further complicated by the fact that false positives are useful in defending against leakage abuse attacks. Leakage abuse attacks attempt to recover client queries using knowledge of the client's data. An important parameter for any leakage-abuse attack is its known-data rate; that is, the fraction of client data that must be known to the adversary.

To date, some systems for searching encrypted data have proven vulnerable to providing responses susceptible to leakage abuse attacks and to providing responses with an excessive number of false positives, which increases the processing load needed for their removal. In particular, when responding to a search query, the number of false positives that need to be removed from a set of search results has a linear relationship to the number of true positives that match the search query. As such, known systems are vulnerable to leakage abuse attacks when there are a low number of true positives. In addition, there is simultaneous and significant performance cost to existing solutions because any search that results in a large number of true positives will contain a high number of false positives which need to be identified and removed.

The present disclosure is directed towards systems and methods that support a wildcard search through the use of an adapted permuterm index that improves control over the number of false positives produced by a search query.

For the purposes of the present disclosure, a wildcard search refers to a wildcard search query and a wildcard search system or method where data values (for example text) can be searched to determine whether a data series matches a "pattern"—as opposed to simply determining whether each element of data in the data series is an exact match to the data provided by the search query.

With reference to text, a wildcard character needs to be entered into a wildcard search query to indicate unknown values. A wildcard character in a query can be used to define an unknown data value within the wildcard search query. A wildcard character is typically assigned to predefined character. This can be done at syntax level in most implementations—e.g., the rules that define the combinations of characters that are considered to be a correctly structured wildcard search query can specify one or more characters in the wildcard search query that are reserved as wildcard characters. Characters that specify letters and numbers are typically not used as a wildcard character. This is because letters and numbers are typically the most common characters used to specify known characters in a wildcard search query. Thus, by not using letters or numbers, the frequency with which a wildcard character might be confused with a known character by the user is reduced.

Wildcard search queries comprise of zero or more literal data entries and zero or more wildcard entries. A literal entry defines an exact data value that must be contained within a query result (e.g. in the case of text, a text value (e.g. an ascii code) representing a letter, number, symbol, punctuation mark, etc.; in the case of binary data a known pattern of ones and zeros; etc.). The exact functionality of a wildcard search typically differs from one implementation to the next; however, common types of text-based wildcard search characters queries and their purposes in wildcard search queries are outlined below. Although text-based wildcard search characters are used for ease of explanation, it should be noted that a value identifying a character (a character value, e.g. an ascii value) is a binary value. As such, the techniques used for searching for a pattern of characters in a data collection are the same as those e.g. used to search for a pattern of binary values (such as hexadecimal values) in a data collection. As such, the following description is not limited to the specific example of text and can be used to identify any binary pattern in a data collection by using binary values instead of characters values.

Zero or More Wildcard Characters:

In this type of wildcard search, a wildcard character matches to a string containing an unknown number of unknown characters (e.g. a string of zero or more arbitrary characters). (In this disclosure the terms 'binary value' and 'character' both refer to a value having a predetermined number of bits). To enter a wildcard character into the wildcard search, a 'zero-or-more' wildcard search character is typically assigned to predefined character. To put it differently, a 'zero-or-more' wildcard search character can be entered into a wildcard search query by a user using any suitable character, e.g. the percentage character (%) or the star character (*), etc. For the purposes of clarity, the percentage symbol is used in this disclosure for indicating a 'zero-or-more' wildcard search character (even though other characters could be used). Thus, the wildcard search query 'test %' represents a series of known characters ('test') followed by a wildcard character ('%') indicating an unknown number of unknown characters. In response to such a wildcard search query, the terms 'test', 'tests', 'tester', 'testify' might be returned.

Single Wildcard Character:

In this type of wildcard search, a wildcard search character matches exactly one unknown character. To enter this wildcard search character into the wildcard search, a 'single' wildcard search character is typically assigned to predefined character. Any suitable predefined character may be used, for example the underscore character (_) or the question mark character (?). For the purposes of the present disclosure, the underscore character is used (event though other characters could be used). Thus, 'te_t' is an example of the use of a 'single' wildcard search character in a wildcard search query. In response to such a query, the terms 'test' and/or 'text' might be returned as a match.

Character Sets:

In this type of wildcard search, a wildcard search character matches exactly one character from a set of characters specified by the user. To enter this wildcard search character into the wildcard search, the set of characters the user wishes to enter are bracketed by predefined characters. Any suitable predefined character may be used, for example square brackets ([ ]) can be used (event though other characters could potentially be used). The character set can for example be entered into the wildcard search as a range of characters, e.g. [a-z](i.e., any lowercase character from 'a' to 'z'), as a list of characters, e.g. [sx](i.e. the character's' or 'x'), or a combination e.g. [a-dx](i.e. any lowercase character from 'a' to 'd' or 'x'). Thus the Wildcard Query 'te[sx]t', might return 'test' and 'text' as matches.

Many implementations of wildcard search also support the use of the NOT operator in a character set wildcard search. This makes it possible for the user to indicate that a match should not occur against one of more characters in the set of characters defined by the character set wildcard search. Any suitable predefined character may be used to enter the NOT operator into the character set wildcard search. For example an exclamation mark character (!) or the circumflex symbol (^) could be used. For the purposes of the present disclosure an exclamation mark character is used to indicate a NOT operator (even though other characters could potentially be used). For example, the Wildcard Query 'te[!sx]t', might return 'teat' and 'tent' as matches.

Although the present disclosure is directed towards permuterm indexing, there are known alternatives to permuterm indexing—such as e.g. K-Gram indexes. A typical K-Gram index is more space-efficient than its equivalent permuterm indexes. However, the initial response set that is produced by a K-Gram index typically includes false-positives. I.e. the use of a K-Gram index typically results in responses to searches including results that do not match the wildcard search query used for the search. This initial response set must then be further processed in an additional post-processing to remove these false-positives. Each result in the initial response set is processed individually and is then (if it is not a false-positive) added to, or (if it is a false positive) removed from or not entered into, a final response set. As a result, the final response set is free of false positives.

For plaintext wildcard searches, performing this post-processing on a server is trivial. However, the use of a plaintext wildcard search results in a clear security vulnerability in any search system. For example, plaintext wildcard searches allow an eavesdropper to determine information about the data being searched from the wildcard queries. This data can then be used in an attack to decrypt the data. It therefore can be advantageous if information passed from a client to a server is encrypted.

There are a number of different ways of implementing a system where a wildcard query and response is encrypted. As a first example the server can be provided with the decryption key(s) necessary to decrypt the initial result set obtained from the search query. This allows the server to perform the post processing. I.e. the server is enabled to perform the postprocessing in the same manner as described above, as if the search query was received in plaintext. However, providing the server with the decryption key(s) required to decrypt the search query reduces security. For example, the decryption key(s) need to be provided by the client to the server. As a result, the decryption key(s) are, at least to some degree, vulnerable to being intercepted and used by an eavesdropper. Further, the decryption key(s) for every client using a server has to be stored at the server. As such, the server becomes an attractive hacking target for a centralized attack on the searching system. Indeed, almost by definition, storing the decryption key(s) increases the number of locations where decryption keys are stored, which in turn increases the chance that at least one decryption key is stored in at least one location that is not secure.

Another approach is to return an encrypted version of the initial result set from the server to the client. In this case, the post-processing is performed by the client. In particular, the client decrypts the initial result set without the need to provide or disclose decryption key(s) to a server. Depending on the wildcard search query being performed, the final result set may need to be re-encrypted and returned to the Server to undergo additional processing. However, one of the functions of a server in a client-server system is to provide processing power. Thus, moving any aspects of the processing of a wildcard search query from a server to a client typically reduces the processing power available to execute these aspects. As a result, returning an encrypted version of an initial result set that includes false positives from the server to a typical client device is only practical for the most basic of wildcard search queries. I.e., those search queries where the post-processing is easily performed (e.g. SELECT name FROM Employees WHERE name LIKE 'Sha %'). The post processing of more advanced wildcard search queries (e.g. those that involve the use of Wildcard Search in conjunction with functions or sub-Queries) will either degrade the performance of the client or require the client to break the wildcard search query into a series of query steps. Some of the operations will need to be performed at the server with inputs from the client and some at the client with inputs from the server. This results in series 'round trips' between the Client and Server in order to produce accurate search result sets. This results in an increase of network traffic. Thus, while this approach may work for very small amounts of data, it will not scale well to large data sets. Furthermore, it is unsuitable for complex wildcard search queries.

To avoid these and other problems the present disclosure is directed to a system in which a server is capable of producing a result set in response to a wildcard search query does not contain false positives. Instead, the number of false positives can be controlled through being pre-computed and included in the encrypted data collection when building the initial permuterm index. This results in the number of false positives having a sub-linear relationship with true-positives in a result set. This is not possible using existing permuterm indexes, which instead have produced a number of false positives a linear relationship with the number of true-positives in a result set.

A permuterm index is used for plaintext wildcard searching. In particular, the processing of a wildcard search query comprises the use of a permuterm index. A first aspect in creating a permuterm index is to use a predetermined character to indicate the end of a keyword. This character is referred to in this disclosure as a delimiter character. Any suitable character can be used for the delimiter character. Solely for the sake of illustration, the dollar character '$' is used as the delimiter character in the present disclosure. Thus, to indicate the end of the keyword a delimiter character is added to the end of the keyword to create a modified keyword. E.g. for the keyword 'hello' a delimiting character is added to create the modified keyword 'hello$'.

The modified keyword is used as an initial entry of the permuterm index. To generate the next entry in the permuterm index, a circular shift is performed on the characters of the modified keyword in a predetermined direction. A circular shift is the operation of rearranging the entries of the modified keyword in a tuple, either by moving the final entry to the first position, while shifting all other entries to the next position (which is referred to in this disclosure as a right direction circular shift), or by moving the first entry to the final position, while shifting all other entries to the previous position (which is referred to in this disclosure as a left direction circular shift). Each subsequent entry in the permuterm index is generated by performing a circular shift on the previous permuterm index entry in the same predetermined direction until a duplicate entry to the index is created (i.e. until the circular shifting produces the modified keyword).

For example, as shown in FIG. 1, the entries for the permuterm index for the keyword 'hello' can be produced used a left direction circular shift as the predetermined direction. E.g. the values of entry 2 are produced by performing a one-value step circular left shift of the values of entry 1.

An advantage of using a left direction circular shift as the predetermined direction is that when the delimiter character occupies the position of the first character (as is the case with entry 6 in Table 1) this is also indicative that a further circular shift is not required.

The entries generated for a keyword are stored in a permuterm index associated with the keyword.

The number of entries for a permuterm index for a given keyword is equal to the number of characters in the word plus one. E.g. the Keyword 'hello' is 5 characters in length; the Delimiter Symbol increases this to 6. As a result, the total number of entries in the permuterm index for the keyword 'hello' is 6 (as shown in Table 1).

The processing of a wildcard search query using a permuterm index can be broken into three parts. In the first part, the wildcard search query is checked to determine if it bracketed by 'zero-or-more' characters (i.e. it has both a leading and a trailing 'zero-or-more' wildcard character e.g. "% 1 %"). If the wildcard search query is bracketed by 'zero-or-more' characters, one of the bracketing 'zero-or-more' characters (e.g. the leading 'zero-or-more' character) may be removed (e.g. "% 1 %" is changed to "1 %"). If the wildcard search query is not bracketed by 'zero-or-more' characters, a delimiter character is appended to the end of the wildcard search query. E.g:

h %→h %$
% o→% o$
h % o→h % o$
h % 1 % o→h % 1 % o$
he__o→he__o$

In the second part, all wildcard search queries containing the 'zero-or-more' wildcard character are modified to produce a modified wildcard search query. In particular, the wildcard search query is modified so that a 'zero-or-more' wildcard character occupies a position at the end of the query. It should be noted that the position of the 'zero-or-more' wildcard character is based on the order in which the data in the data collection is stored. I.e. the end of a key-word in the data collection will be closer to the end of the data collection than the start of the key-word. In European languages, if there are two characters in a data collection such as a document, the right character will occur later in the data collection. Thus, the right most position will correspond to the end of a pattern of values as they are stored in the data collection. However, if the text is read right-to-left (e.g. Arabic), the left character will occur later in the data collection. Thus, in Arabic the left most position will correspond to the end of a pattern of values as they are stored in the data collection. If the wildcard search query does not already have a 'zero-or-more' wildcard value in the position at the end of the query, it is typically modified by performing a one or more circular shift operations in a predetermined direction on the wildcard search query entry, until a 'zero-or-more' wildcard character occupies the position at the end of the query within the modified wildcard search query.

If a wildcard search query contains: no wildcard characters, one or more 'single' wildcard characters; one or more wildcard character sets; or a combination of one or more 'single' wildcard characters and one or more wildcard character sets, i.e. if the wildcard search query does not contain a zero or more wildcard character, then the modified wildcard search query is the wildcard search query with a delimiter character symbol appended to position at the end of the query. For example, the modified wildcard search query for 'he__o' is 'he__o$'. This modified search query matches to index entry 1 (hello$) in Table 1. As such, this the modified keyword matches to a permuterm index entry for the keyword 'hello' and this keyword is added to the result set for the query he_o$.

As shown in FIG. 2, Table 2 sets out a number of examples of modified wildcard search queries. The modified wildcard search query is then compared to the entries of a permuterm index to see if the modified wildcard search query matches an entry in the permuterm index. If one of the entries of the permuterm index matches the modified wildcard search query, then the keyword associated with the permuterm index (i.e. the keyword from which the permuterm index is derived) is added to the result set for the wildcard search query.

However, if the modified wildcard search query contains multiple zero-or-more wildcard characters (with at least one zero-or-more wildcard character between the leading and trailing characters of the wildcard search query, the modified wildcard search query is broken into multiple parts. In particular, the modified wildcard search query is split into sub-queries, such that the sub-queries end with a zero-or-more wildcard character. In order for a match with a keyword to occur, all the sub-queries of the modified wildcard search query must match entries in the permuterm index associated with the keyword.

By way of example, if the keyword is 'hello' and the leading character of wildcard search query is a 'zero-or-more' wildcard character (e.g. % o$) then the wildcard search is performed as follows. Firstly, a modified wildcard search query is generated (as shown in Table 2, modified wildcard search query for '% o$' is 'o$%'). The modified wildcard search query is compared with the entries of the permuterm index for the keyword hello (which are shown in Table 1). It can be seen that 'o$%' matches index entry 5 in Table 1 (i.e. 'o$%' matches 'o$hell'—as the % character is being used in this disclosure to represent zero-or-more unknown characters and the first two known characters of the modified wildcard search query are equal to the first two characters of index entry 5 in Table 1). As the modified wildcard search query matches an entry in the permuterm index for the keyword 'hello', 'hello' is added to the result set for the wildcard search query.

As a further example, if the keyword is 'hello' and the trailing character of wildcard search query is a 'zero-or-more' wildcard character (e.g. h %$) then the wildcard search is performed as follows. A modified wildcard search query is produced (e.g. $h %). The modified wildcard search query is compared with the entries of the permuterm index for the keyword hello. It can be seen that '$h %' matches index entry 6 from Table 1 ('$hello'). As the modified wildcard search query matches an entry in the permuterm index for the keyword 'hello', 'hello' is added to the result set for the wildcard search query.

As a further example, if the keyword is 'hello' and the wildcard search query contains a zero-or-more wildcard character between its leading and trailing characters (e.g. h % o$) then the wildcard search is performed as follows. A modified wildcard search query is produced (e.g. o$h %). The modified wildcard search query is compared with the entries of the permuterm index for the keyword hello. It can be seen that 'o$h %' matches index entry 5 from Table 1 ('o$hell'). As the modified wildcard search query matches an entry in the permuterm index for the keyword 'hello', 'hello' is added to the result set for the wildcard search query.

As a further example, if the keyword is 'hello' and the wildcard search query is bracketed by zero-or-more wildcard characters (e.g. %1%) then the wildcard search is performed as follows. A modified wildcard search query is produced (e.g. 1%). The modified wildcard search query is compared with the entries of the permuterm index for the keyword hello. It can be seen that '1%' matches index entry 3 ('llo$he') and index entry 4 ('lo$hel') from Table 1. As the modified wildcard search query matches an entry in the permuterm index for the keyword 'hello', 'hello' is added to the result set for the wildcard search query.

As a further example, if the keyword is 'hello' and the wildcard search query contains multiple zero-or-more wildcard characters (with at least one zero-or-more wildcard character between the leading and trailing characters of the wildcard search query, the modified wildcard search query is broken into multiple parts. For example, given the modified wildcard search query 'o$h % l %' is split into two subqueries, each ending in a zero-or-more wildcard search character, i.e. 'o$h %' and 'l%'.

It can be seen that the first sub-query ('o$h %') matches with the values in entry 5 ('o$hell') from Table 1 above. As such the first sub-query matches a permuterm index entry for the keyword 'hello'. The second sub-query ('l%') matches with the values in entry 3 ('llo$he') from Table 1 above. As such the second sub-query matches a permuterm index entry for the keyword 'hello'. As both sub-queries match permuterm index entries for the keyword 'hello', the keyword 'hello' is added to the result set for the wildcard search query.

If a wildcard search query contains one zero-or-more wildcard characters and: one or more 'single' wildcard characters; one or more wildcard character sets; or a combination of one or more 'single' wildcard characters and one or more wildcard character sets, then the wildcard search query should be modified as set out above. I.e. a delimiter character should be appended to the wildcard search query and one or more circular shift operation are performed to produce a modified wildcard search query with a zero-or-more wildcard character as the final character in the modified wildcard search query.

It should be noted that the search process only considers known characters as part of the matching process, i.e. the first X known characters of a modified wildcard search query are equal to the first X characters of an entry in a permuterm index for a given keyword. When processing wildcard search queries containing a single wildcard character, it is simply a case of verifying that an additional value is present in the values of the permuterm index entry being examined (with the value itself being irrelevant). In the case of processing wildcard character sets, the value being examined must be compared against the set of values defined by the wildcard value set—with a match being determined accordingly based on whether the wildcard value set includes a value which constitute a match, or (when the NOT operator is used) a mismatch.

While the use of a permuterm index as set out above is useful for wildcard searches in which the keyword and wildcard search query are in plain text, it cannot be used when the keyword and wildcard search query are encrypted. This is because it is not possible to examine or compare encrypted data values on a value-by-value basis. This is a result of use of Shannon's confusion and diffusion principals in modern cryptography (which are designed specifically to prevent such an operation being performed). To address this issue, a modified permuterm index is used as set out below.

In particular, for a given keyword, a modified permuterm index is generated from the index values present in a permuterm index entry for that keyword. In this disclosure of a modified permuterm index, the index entries in a normal permuterm index (i.e. a permuterm index used for unencrypted data as described above) are referred to as normal index values. A modified permuterm index entry that can be used to perform an encrypted search on a wildcard search query to identify the query is present in a portion of encrypted data is generated based on a normal permuterm index entry.

In particular, modified permuterm index entries are generated from a normal permuterm index entry (where the normal permuterm index entry has X values (e.g. characters values, binary values, etc.) as follows. A first modified index permuterm entry is the first entry of the normal permuterm index entry, appended with a zero-or-more wildcard value. The second modified index permuterm entry is the first two values of the normal permuterm index entry, appended with a zero-or-more wildcard value. The Nth modified index permuterm entry is the first N values of the normal permuterm index entry, appended with a zero-or-more wildcard value. The last modified permuterm index entry is all X values of the normal permuterm index, appended with a zero-or-more wildcard value.

Modified permuterm index entries can be generated from each normal permuterm index entries for a given keyword.

It is possible to store all the modified permuterm index entries, however it can be advantageous to reduce the number of entries that need to be stored.

In particular, the number of modified permuterm index entries that need to be stored can be reduced by not storing duplicates of modified permuterm index entries that have already been stored in the modified permuterm index.

In addition, the number of modified permuterm index entries that need to be stored can be reduced by excluding any entries matching '$%'—i.e. entries that corresponds to a wildcard search query that comprises only the delimiting character and the zero-or-more wildcard character. This wildcard search query matches all possible values; and as such, it does not produce useful search results and does not need to be included.

In some embodiments, the number of modified permuterm index entries that need to be stored can be further reduced by only storing modified permuterm index entries that represent valid wildcard search queries for a normal permuterm index value in the modified permuterm index. In particular, a keyword is appended with a delimiter character in the normal permuterm entries to signify the end of the end of the keyword. As such, a modified permuterm index value that contains a zero-or-more character in the same position as the delimiter character in the corresponding normal permuterm entry will match to a wildcard search query for a word that contains extra characters that come after the end of the keyword associated with the modified permuterm index—i.e. they will not match the keyword associated with the modified permuterm index.

As a further example, only one of the normal permuterm index values needs to be stored. In particular, as the modified permuterm index values are used to match to queries comprising a zero-or-more wildcard character, none of the normal permuterm index values are required for this function. As such, only the normal permuterm index value which matches the keyword appended with the delimiting character should be retained so that a search query for the keyword without a zero-or-more wildcard character can be matched to this normal permuterm index value.

As shown in FIG. 3, Table 3 illustrates the generation of modified permuterm Index entries from the set of normal permuterm index (i.e. those shown previously in Table 1).

The normal permuterm entries contains the set of values generated by the standard permuterm indexing algorithm used for plaintext searching.

In turn, this set of values is used as the basis from which the modified permuterm values are derived. The 1 Char column contains the first character of the corresponding normal permuterm value of Table 3, followed by a zero-or-more wildcard character. The 1-2 Char column contains the first two characters of each value listed in the corresponding normal permuterm value of Table 3—followed by a zero-or-more wildcard character. The 1-3 Char column contains the first three characters the corresponding the normal permuterm value followed by a zero-or-more wildcard character (and so forth). The final column—titled Char 1-6—contains the value listed in the corresponding normal permuterm value followed by a zero-or-more wildcard character.

The value marked with a tick (') in Table 3 is a duplicate of a pre-existing modified permuterm index value. I.e. this value does not need to be stored.

The value marked with two ticks (") in Table 3 is an entry that corresponds to a wildcard search query that comprises only the delimiting character and the zero-or-more wildcard character. I.e. this value does not need to be stored.

The values marked with three ticks ("') in Table 3 are entries that correspond to a wildcard search query which will not match the keyword associated with the modified permuterm index (i.e. 'hello'). To put it differently, these entries map onto the end of keyword, but do not include the delimiter character indicating the end of the keyword—as a result, this causes an error where the entries will not match to the keyword. These values may not be stored as they will produce false positives.

The values marked with four ticks ("") in Table 3 are normal permuterm index values which are redundant in light of the remaining modified permuterm index values. These values do not need to be stored.

As such, the index values of the modified permuterm index comprise a combination of both raw text values (i.e. character values) and wildcard characters.

In a system in accordance with the present disclosure, a client device is configured to generate a modified permuterm index. In particular, the client generates modified permuterm index entries for a document collection. Generating a modified permuterm index entry at the client also can comprise encrypting the modified permuterm index entry with a predetermined encryption system at the client. Any deterministic cryptographic primitive can be used. For example, a standard symmetric or public-key cipher or a cryptographic hash function (keyed (HMAC) or non-keyed) could be used. However, a Hash-based Message Authentication Code (HMAC) has been found to be particularly suitable because it is resistant to dictionary attacks. HMAC can be advantageous because it requires a key—and as such, only authorized users can query it. Furthermore, a HMAC system prevents the decryption of index entries—this can be advantageous because only portions of the data collection that match the search criteria need to be decrypted. In this disclosure, FK(x) is used to represent a suitable encryption function which is performed on x to produce an encrypted value. The client then stores the encrypted modified permuterm index entries in a modified permuterm index.

As shown in FIG. 4, Table 4, shows an example of a modified permuterm index for the keyword 'hello'. Once the modified permuterm index has been generated, one or more documents in the associated document collection are encrypted with the predetermined encryption system at the client. The entries in the posting list are also encrypted with the predetermined encryption system at the client. The client then forwards the modified permuterm index, the encrypted document collection associated with modified permuterm index, and the posting list associated with the encrypted document collection to a server for storage.

In order to perform a wildcard search query against a document collection stored on a server, the client encrypts the wildcard query using the first predetermined encryption system to produce an encrypted wildcard query. The encrypted wildcard query is referred to herein as a search token. The client then forwards the search token to the server.

The server uses the search token to search a modified permuterm index to determine if it matches a modified permuterm index entry. If a match is found, in the encrypted keyword associated with the permuterm index is used to identify the set of encrypted documents (within the associated document collection) which contain keywords than match the search token. In particular, the encrypted keyword is used in conjunction with the encrypted entries in the posting list to determine the documents that contain the keyword. The server then returns the result set (i.e. the set of encrypted documents matching to the search token) to the client. These documents can then be decrypted locally by the Client.

By utilizing this approach, the need to examine indexed values on a character-by-character basis can be circumvented when processing wildcard search queries. Instead, wildcard search queries can be directly compared against entries in the modified permuterm index for overall equality, i.e. a perfect match. Checking for an exact match is an operation that is supported by many deterministic cryptographic primitives including hash functions and ciphers.

Further, it is to be noted that the server does not need to decrypt any of the entries in an encrypted permuterm index, or encrypted portions of data in the encrypted data collection to perform a search.

Similarly to a 'normal' permuterm index, a wildcard search query needs to be modified prior use for an encrypted wildcard search with a modified permuterm index. The wildcard search query is modified in the same way as described above for a normal wildcard search. Once a modified wildcard search query has been produced, the modified wildcard search query is encrypted using the predetermined encryption system (i.e. it is encrypted using the same function as that used to encrypt the values in the modified permuterm index). Where a modified wildcard query comprises sub-queries (i.e. where the wildcard search query contains multiple zero-or-more wildcard characters, and at least one of the zero-or-more wildcard characters is neither the leading or trailing character), the encryption is performed separately on each sub-query so that each sub-query is separate and encrypted.

The following is a description as to how each wildcard query listed in Table 2 is performed against the set of values listed in the modified permuterm index for the keyword 'hello' (as shown in Table 4):

If the server receives the encrypted modified wildcard search query FK(o$%)—it will be able to match it as an exact match to value 25 in Table 4. As the query matches a value in the modified permuterm index, the wildcard search query matches the keyword 'hello'.

If the server receives the encrypted modified wildcard search query FK($h %)—it will be able to match it as an exact match to value 1 in Table 4. As the query matches a value in the modified permuterm index, the wildcard search query matches the keyword 'hello'.

If the server receives the encrypted modified wildcard search query FK(o$h %)—it will be able to match it as an exact match to value 26 in Table 4. As the query matches a value in the modified permuterm index, the wildcard search query matches the keyword 'hello'.

If the server receives the encrypted modified wildcard search query FK(1%)—it will be able to match it as an exact match to value 16 in Table 4. As the query matches a value in the modified permuterm index, the wildcard search query matches the keyword 'hello'

If the client receives a search query from a user or a program running on the client, where the search query comprises a plurality of zero-or-more wildcard characters, one of which is neither the leading or trailing character, (e.g. o$h % l %) the client splits the query into subqueries ending in a zero-or-more wildcard character as discussed above with reference to a normal permuterm index searches (e.g. o$h % and 1%). The subqueries are the encrypted (e.g. FK(o$h %) and FK(1%)) and provided to the server.

If the server is able to match all the subqueries of a query to entries in a modified permuterm index for a particular keyword, then the query matches the keyword.

For example, the server will be able to match the first subquery example FK(o$h %) as an exact match to value 26 in Table 4. The server will also be able to match the second subquery example FK(1%) to value 16 in Table 4. As both these subqueries match values in the modified permuterm index for the word hello, the wildcard search query matches the keyword 'hello' As noted above, it isn't possible to examine encrypted data values on a character-by-character basis. Thus, to support both single wildcard characters and characters set wildcard, the client must provide a plurality of search queries at runtime. Each search query is for one possible value of the single wildcard characters or characters set wildcard. The plurality of search queries include a search query for all possible values of the single wildcard characters or characters set wildcard. These queries are encrypted and sent to the server as a Boolean OR search—i.e. the result set returned by the server will include documents containing a keyword that match any of the encrypted queries.

For example, consider the following wildcard search query: Te[sx]t$. To perform a search with this query, the client first generates a plurality of search queries for all possible values of the characters set wildcard—i.e. Test$ and Text$. Following this, the Client encrypts the query (i.e. FK(Test$) and FK(Text$). The encrypted queries are sent to the server as an OR search (i.e. FK(Test$) OR FK(Text$)) and the result set returned by the server will include documents containing either of these terms.

While the preceding example above demonstrates the use of character sets only, the technique used is the exact same when handling the single wildcard character. I.e. search queries are generated for all possible values of the single wildcard character. However, in this case the underlying text encoding mechanism determines the set of queries. For example, in ASCII there are 255 characters. Thus, for query containing a single wildcard character, 255 encrypted queries need to be generated by the client device and sent to the server for searching.

Where a wildcard query contains a zero-or-more wildcard character and a single wildcard character (or a wildcard character set), the zero-or-more wildcard character is handled last. I.e. all possible search queries for the single wildcard character (or a wildcard character set) are generated first, and then the zero-or-more wildcard character in each query is handled as set out above.

Although performing separate searches for each possible value of a single wildcard character (or a wildcard character set) is computationally expensive, in practice it does not have a significant impact on performance because these searches are used much less frequently than those using the zero-or-more wildcard character.

In addition, false positives can be pre-computed when building the initial modified permuterm index. These false positives can be included in the modified permuterm index. Thus, the modified permuterm index for a keyword can be further modified to generate an adjustable number of false positives to prevent against to defend against leakage abuse attacks.

The invention claimed is:

1. A method of generating a modified permuterm index entry for use in a search for a keyword in a portion of an encrypted data collection, comprising:
at a client:
identifying a keyword in one or more portions of an encrypted data collection;
generating a permuterm index entry for the keyword, wherein the permuterm index entry comprises X values including a delimiting value inserted after the last value of the keyword, and wherein the delimiting value marks the end of the keyword;
generating a modified permuterm index entry for the keyword from the permuterm index entry, wherein the modified permuterm index entry comprises the first Y values of the permuterm index entry appended with a zero-or-more wildcard value, wherein Y is greater than zero and Y is less than or equal to X; and
storing the modified permuterm index entry in a modified permuterm index.

2. The method of claim 1, wherein the storing comprises:
determining if the modified permuterm index entry is a duplicate of another modified permuterm index entry already stored in the modified permuterm index; and
storing the modified permuterm index entry in the modified permuterm index if the modified permuterm index entry is not a duplicate of another modified permuterm index entry already stored in the modified permuterm index.

3. The method of claim 1, wherein the storing comprises:
determining if the permuterm index entry consists of a delimiting value and a wildcard value; and
storing the modified permuterm index entry in the modified permuterm index if the modified permuterm index entry does not consist of a delimiting value and a wildcard value.

4. The method of claim 1, wherein the storing comprises:
determining if the last value of the keyword is present in the modified permuterm index and storing the modified permuterm index if it does not comprise the last value of the keyword;
determining if the last value of the keyword is followed by the delimiting value in the modified permuterm index; and
storing the modified permuterm index entry in the modified permuterm index if the last value of the keyword in the modified permuterm index entry is followed by the delimiting value.

5. The method of claim 1, wherein the storing comprises:
determining if the last value of permuterm index entry is the delimiting value; and
storing the permuterm index entry in the modified permuterm index if the last value of permuterm index entry is the delimiting value.

6. The method of claim 1, further comprising:
encrypting the modified permuterm index;
encrypting the data collection; and
sending the encrypted modified permuterm index and the encrypted data collection to a server.

7. The method of claim 6, wherein a Hash-based Message Authentication Code (HMAC) is used to encrypt the modified permuterm index.

8. The method of claim 1, wherein a value is a binary value representing a alphanumeric character.

9. The method of claim 1, wherein the method further comprises storing an additional entry in the modified permuterm index, wherein the additional entry is configured in use to generate a false positive.

10. The method of claim 1, wherein the zero-or-more wildcard value indicates an unknown number of unknown values.

11. A method for retrieving one or more portions of an encrypted data collection, comprising:
   at a server:
      receiving a search token, wherein the search token is an encrypted search query;
      comparing the values of the search token to the values of an entry in a modified permuterm index, wherein the modified permuterm index comprises a plurality of encrypted entries for a keyword wherein at least one entry has less values than another entry; and
      if the values of the search token match the values of the entry of the modified permuterm index, identifying one or more portions of an encrypted data collection associated with the keyword.

12. A data processing device configured to perform the method according to claim 1.

13. A non-transitory computer-readable storage medium storing a computer program comprising instructions which, when executed by a computing device, cause the computing device to perform the method according to claim 1.

14. A computer system comprising at least one processor and memory storing a computer program configured to carry out the method of claim 1.

\* \* \* \* \*